US009235387B1

(12) United States Patent
Cizek et al.

(10) Patent No.: US 9,235,387 B1
(45) Date of Patent: Jan. 12, 2016

(54) METHODS, SYSTEMS, AND COMPUTER PROGRAM PRODUCTS FOR EVALUATING THE COMPATIBILITY OF A COMPUTER PROGRAM WITH TARGET DATA PROCESSING ENVIRONMENTS BASED ON ASSOCIATIONS BETWEEN SOURCE CODE INSTRUCTIONS AND REQUIRED DATA PROCESSING FACILITIES (71) Applicant: CA, Inc., Islandia, NY (US)

(72) Inventors: Michal Cizek, Prague (CZ); Lukas Patera, Kladno (CZ)

(73) Assignee: CA, Inc., New York, NY (US)

( * ) Notice: Subject to any disclaimer, the term of this patent is extended or adjusted under 35 U.S.C. 154(b) by 59 days.

(21) Appl. No.: 13/785,758

(22) Filed: Mar. 5, 2013

(51) Int. Cl.
*G06F 9/44* (2006.01)
*G06F 9/45* (2006.01)

(52) U.S. Cl.
CPC ... *G06F 8/41* (2013.01); *G06F 8/70* (2013.01)

(58) Field of Classification Search
CPC ..................................... G06F 8/41; G06F 8/70

USPC .................................................. 717/120–123
See application file for complete search history.

(56) References Cited

U.S. PATENT DOCUMENTS

| 5,946,493 | A  | * | 8/1999 | Hanson | 717/124 |
| 7,743,373 | B2 | * | 6/2010 | Avram et al. | 717/174 |
| 8,533,668 | B2 | * | 9/2013 | de Oliveira Costa | 717/110 |

* cited by examiner

*Primary Examiner* — Ted T Vo
(74) *Attorney, Agent, or Firm* — Myers Bigel Sibley & Sajovec, P.A.

(57) ABSTRACT

A method includes performing operations as follows wherein at least a portion of at least one of the operations is performed on at least one processor: comparing instructions of a computer program with source code instructions in a source code catalog that are associated with a required data processing facility and determining whether the required data processing facility is used for execution of any of the instructions of the computer program based on the comparison of the computer program instructions with the source code instructions in the source code catalog. Related systems and computer program products are also disclosed.

22 Claims, 6 Drawing Sheets

FIG. 7 with TARGET DATA PROCESSING ENVIRONMENTS BASED ON ASSOCIATIONS BETWEEN SOURCE CODE INSTRUCTIONS AND REQUIRED DATA PROCESSING FACILITIES

BACKGROUND

The present disclosure relates to computing systems, and, in particular, to evaluating the compatibility of a computer program for execution in target data processing environments.

Figure 1:
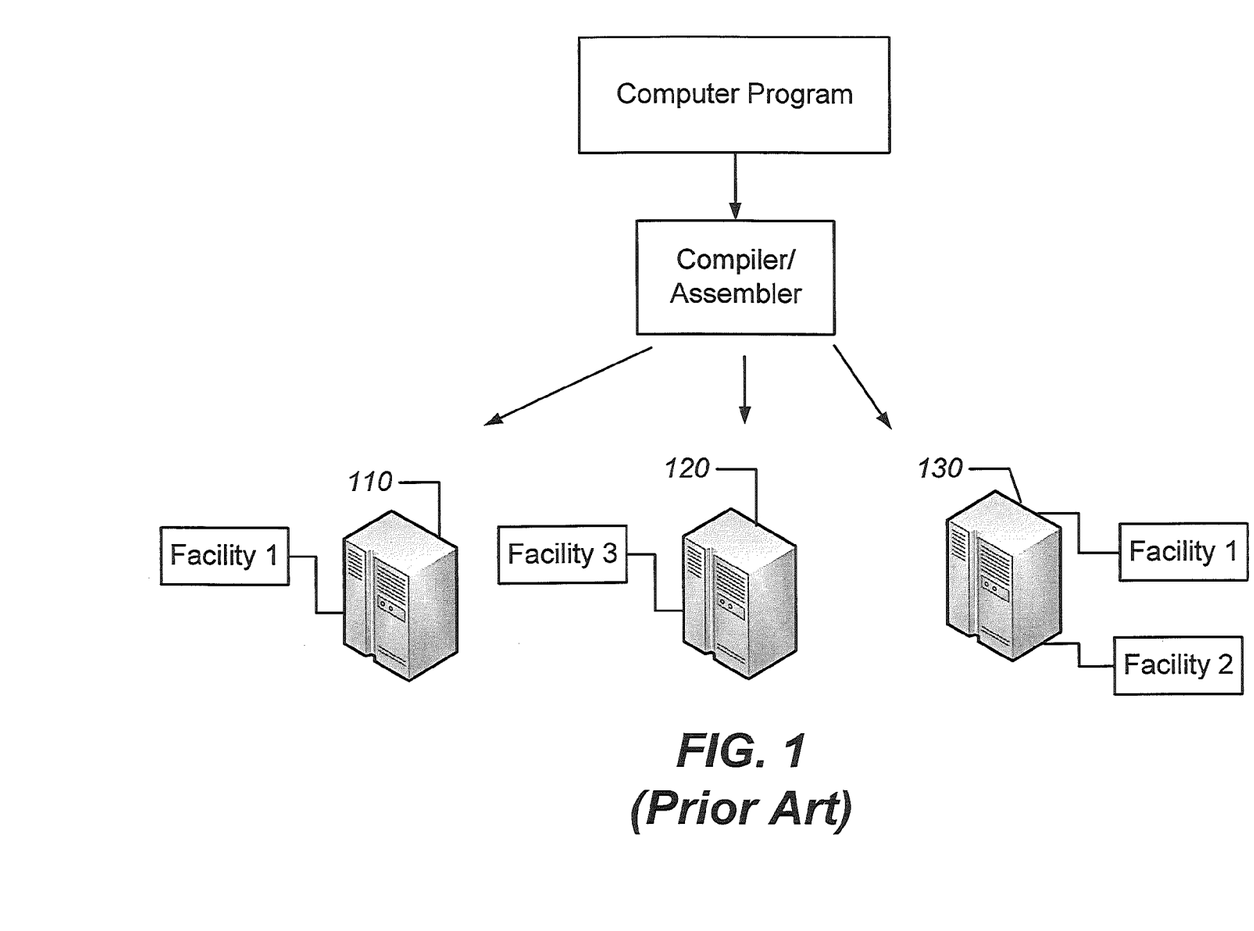
FIG. 1 is a block diagram that illustrates the conventional development of a computer program for multiple target data processing system environments.

Computer programs written for a particular data processing hardware architecture may nevertheless fail to execute correctly or even execute at all due to variations in the way the hardware is configured. Data processing systems may be configured with a variety of different data processing facilities. These data processing facilities may include additional hardware, such as a co-processor, or different firmware versions, for example. As shown in FIG. 1, a computer program may be written in a high-level language and then processed using a compiler and/or assembler to generate the executable object code to run on various data processing systems 110, 120, and 130. While the data processing systems 110, 120, and 130 may have a common general architecture, they may nevertheless be configured with different data processing facilities. In FIG. 1, data processing systems 110 and 130 both include data processing facility 1, but data processing system 130 further includes data processing facility 2. Data processing system 120 does not include either of data processing facilities 1 and 2, but instead includes data processing facility 3. Compilers and/or assemblers may sometimes include options for generating the executable object code based on the particular data processing facility/facilities associated with a target execution data processing system, but this may not always be the case resulting in booting errors, run time execution errors, and the like when the executable object code is not compatible with the particular data processing facility/facilities installed on the target data processing system.

SUMMARY

In some embodiments of the inventive subject matter, a method comprises performing operations as follows wherein at least a portion of at least one of the operations is performed on at least one processor: comparing instructions of a computer program with source code instructions in a source code catalog that are associated with a required data processing facility and determining whether the required data processing facility is used for execution of any of the instructions of the computer program based on the comparison of the computer program instructions with the source code instructions in the source code catalog.

In other embodiments, the source code instructions are associated with a plurality of data processing facilities and determining whether the required data processing facility is used for execution of any of the instructions of the computer program comprises: determining whether any of the plurality of data processing facilities is used for execution of any of the instructions of the computer program based on the comparison of the computer program instructions with the source code instructions in the source code catalog.

In still other embodiments, the method further comprises generating a report that identifies which ones of the plurality of data processing facilities are used for execution of the instructions of the computer program.

In still other embodiments, generating the report comprises generating the report that identifies, for each respective one of the instructions of the computer program, which ones of the plurality of data processing facilities are used for execution of the respective one of the instructions of the computer program.

In still other embodiments, the method further comprises providing a template configuration profile that comprises a list of data processing facilities associated with a target data processing system, and generating an indication of whether the instructions of the computer program are compatible with the target data processing system for execution based on the determination of whether the required data processing facility is used for execution of any of the computer program instructions and the list of data processing facilities associated with the target data processing system in the template configuration profile.

In still other embodiments, the target data processing system is one of a plurality of data processing systems. The list of data processing facilities is a first list of data processing facilities and the template configuration profile comprises a second list of data processing facilities associated with the plurality of data processing systems.

In still other embodiments, the method further comprises generating an indication of whether the instructions of the computer program are compatible with the plurality of target data processing systems for execution based on the determination of whether the required data processing facility is used for execution of any of the computer program instructions and the second list of data processing facilities associated with the plurality of target data processing systems in the template configuration profile.

In still other embodiments, generating the indication comprises generating a report that identifies a percentage of the plurality of target data processing systems for which the instructions of the computer program are compatible.

In still other embodiments, generating the indication comprises generating a report that identifies, for each respective one of the instructions of the computer program, a percentage of the plurality of target data processing systems for which the respective one of the instructions of the computer program is compatible.

In still other embodiments, the source code instructions in the source code catalog are defined by a high-level programming language that is compiled to generate object code.

In still other embodiments, the source code instructions in the source code catalog are defined by assembly language.

In still other embodiments, the source code instructions in the source code catalog are defined by an interpreted programming language.

In still other embodiments, the required data processing facility comprises a hardware component.

In still other embodiments, the required data processing facility comprises a firmware component.

In further embodiments of the inventive subject matter, a system comprises a processor and a memory coupled to the processor that comprises computer-readable program code that when executed by the processor causes the processor to perform operations comprising: comparing instructions of a computer program with source code instructions in a source code catalog that are associated with a required data processing facility and determining whether the required data processing facility is used for execution of any of the instructions of the computer program based on the comparison of the computer program instructions with the source code instructions in the source code catalog.

In still further embodiments, the source code instructions are associated with a plurality of data processing facilities and determining whether the required data processing facility is used for execution of any of the instructions of the computer program comprises determining whether any of the plurality of data processing facilities is used for execution of any of the instructions of the computer program based on the comparison of the computer program instructions with the source code instructions in the source code catalog.

In still further embodiments, the operations further comprise generating a report that identifies which ones of the plurality of data processing facilities are used for execution of the instructions of the computer program.

In still further embodiments, the operations further comprise providing a template configuration profile that comprises a list of data processing facilities associated with a target data processing system and generating an indication of whether the instructions of the computer program are compatible with the target data processing system for execution based on the determination of whether the required data processing facility is used for execution of any of the computer program instructions and the list of data processing facilities associated with the target data processing system in the template configuration profile.

In other embodiments of the inventive subject matter, a computer program product comprises a computer readable storage medium having computer readable program code embodied in the medium. The computer readable program code comprises computer readable program code to compare instructions of a computer program with source code instructions in a source code catalog that are associated with a required data processing facility and computer readable program code to determine whether the required data processing facility is used for execution of any of the instructions of the computer program based on the comparison of the computer program instructions with the source code instructions in the source code catalog.

In still other embodiments, the source code instructions are associated with a plurality of data processing facilities and the computer readable program code to determine whether the required data processing facility is used for execution of any of the instructions of the computer program comprises computer readable program code to determine whether any of the plurality of data processing facilities is used for execution of any of the instructions of the computer program based on the comparison of the computer program instructions with the source code instructions in the source code catalog.

In still other embodiments, the computer program product further comprises computer readable program code to generate a report that identifies which ones of the plurality of data processing facilities are used for execution of the instructions of the computer program.

In still other embodiments, the computer program product further comprises computer readable program code to provide a template configuration profile that comprises a list of data processing facilities associated with a target data processing system and computer readable program code to generate an indication of whether the instructions of the computer program are compatible with the target data processing system for execution based on the determination of whether the required data processing facility is used for execution of any of the computer program instructions and the list of data processing facilities associated with the target data processing system in the template configuration profile.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, the term "data processing facility" includes, but it not limited to, a hardware element, firmware component, and/or software component. A data processing system may be configured with one or more data processing facilities.

Some embodiments of the inventive subject matter stem from a realization that a source code catalog can be provided in which individual source code instructions are associated with any required data processing facilities. The instructions of a computer program can be compared with the source code instructions in the source code catalog to determine if any of the instructions in the computer program require particular data processing facilities be installed in the target data processing system where the computer program is to execute. Various reports can be generated that are indicative of the compatibility of a computer program with a particular data processing system environment. For example, a report may identify which data processing facilities are required for execution of a computer program. A report may also provide an annotated listing of the computer program in which the required data processing facilities are identified on a per instruction basis.

A template configuration profile may also be provided that provides a list of facilities associated with one or more target data processing systems. When the configuration of the target data processing system(s) is known, an indication can be generated of whether a computer program is compatible for execution on the target data processing system(s) based on whether the computer program has any instructions that are associated with one or more required data processing facilities and whether the target data processing system(s) has those required data processing facility/facilities installed. When the template configuration profile includes lists of facilities associated with multiple target data processing systems, a report can be generated that indicates the percentage of the target data processing systems the computer program would be compatible with, i.e., be able to execute on because any required data processing facilities are installed. Such a report can also be generated on a per instruction basis in which individual instructions of the computer program have a percentage associated therewith that indicates the probability that the instruction can be executed on a particular group of target data processing systems.

Figure 2:
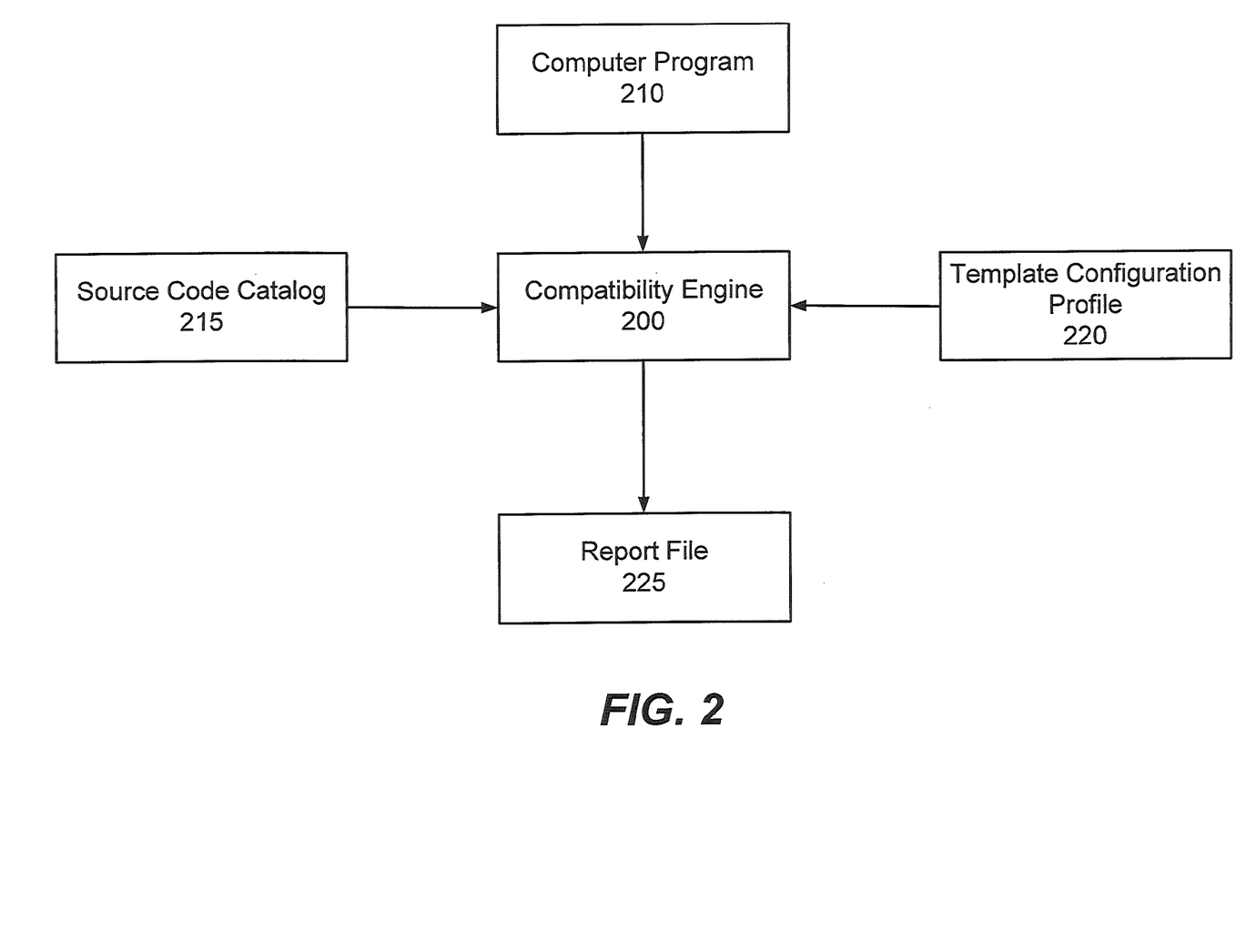
FIG. 2 is a block diagram that illustrates a system for evaluating a computer program to determine any required data processing facilities for executing the computer program and also for evaluating whether the computer program is compatible with one or more target data processing systems for execution based on what data processing facilities they have installed according to some embodiments of the inventive subject matter.

FIG. 2 is a block diagram that illustrates a system for evaluating a computer program to determine any required data processing facilities for executing the computer program and also for evaluating whether the computer program is compatible with one or more target data processing systems for execution based on what data processing facilities they have installed according to some embodiments of the inventive subject matter. A computer program compatibility engine 200 receives a computer program 210 for analysis. According to various embodiments, the computer program 210 is written in a high-level programming language that is ultimately compiled to generate executable object code for execution on one or more target data processing systems. In other embodiments, the computer program 210 is written in assembly language, which can be assembled to generate the executable object code for execution on one or more target data processing systems. The computer program 210 may also be written in an interpreted programming language or may be processed using a Just-In-Time compiler.

The compatibility engine 200 is configured to scan the instructions of the computer program and compare those instructions with the instructions in a source code catalog 215. The source code instructions in the source code catalog 215 are defined by a high-level programming language, assembly language, interpreted programming language or other appropriate language that corresponds to the computer program 210. The source code catalog 215 associates source code instructions with data processing facilities that are required to execute those instructions. Thus, a source code instruction may have one or more data processing facilities associated therewith that are used for executing the instruction on a target data processing system.

The compatibility engine 200 may generate one or more reports 225 that identify what data processing facilities are required for executing the computer program 210 based on the comparison of the computer program 210 instructions with the instructions in the source code catalog 215.

A Template Configuration Profile 220 may be used to identify a list of facilities that are associated with a target data processing system. For example, a target data processing system may have a list or one or more data processing facilities that are installed on the target data processing system. The TCP 220 may include such information for multiple target data processing systems with each target data processing system having its own list of installed data processing facilities. The compatibility engine 200 may be configured to use the required data processing facility/facilities identified from comparing the computer program 210 instructions with the source code instructions in the source code catalog 215 to compare with the data processing facilities on the list(s) for the one or more target data processing systems in the TCP 220. The compatibility engine 200 may then determine whether the computer program 210 is compatible for execution on the target data processing systems represented in the TCP 220.

The compatibility engine 200 may generate one or more reports 225 that identify whether the computer program 210 is compatible with the one or more target data processing systems represented in the TCP 220 for execution. When there are multiple target data processing systems represented in the TCP 220, the reports 225 may identify a percentage of the target data processing systems that the computer program 210 is compatible with for execution, Such reports 225 may also be provided for individual instructions of the computer program 210 such that an individual instruction has a percentage associated therewith that indicates the percentage of the target data processing systems that the instruction is compatible with for execution thereon.

Although FIG. 2 illustrates an exemplary system for evaluating a computer program to determine any required data processing facilities for executing the computer program and also for evaluating whether the computer program is compatible with one or more target data processing systems for execution based on what data processing facilities they have installed, it will be understood that embodiments of the present invention are not limited to such configurations, but are intended to encompass any configuration capable of carrying out the operations described herein.

Figure 3:
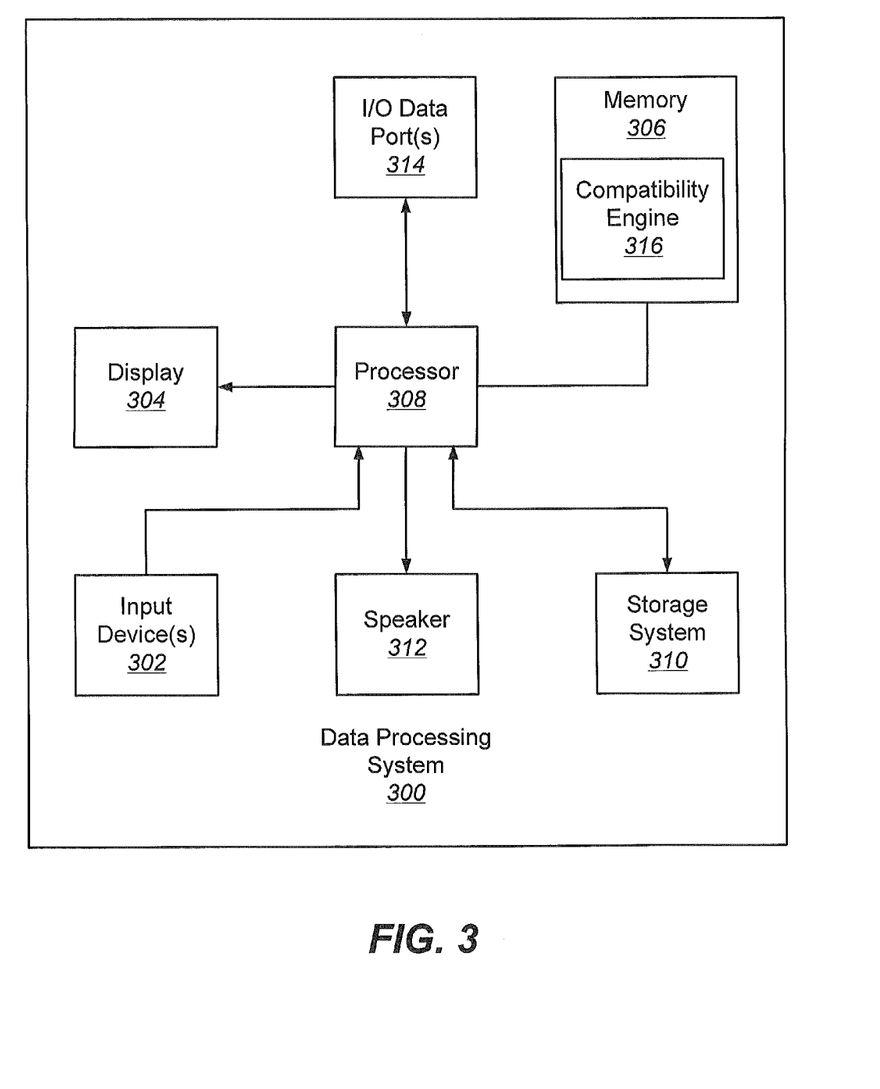
FIG. 3 illustrates a data processing system that may be used to implement the compatibility engine of FIG. 1 according to some embodiments of the inventive subject matter.

Referring now to FIG. 3, a data processing system 300 that may be used to implement the compatibility engine 200 functionality of FIG. 2, in accordance with some embodiments of the inventive subject matter, comprises input device(s) 302, such as a keyboard or keypad, a display 304, and a memory 2306 that communicate with a processor 308, The data processing system 300 may further include a storage system 310, a speaker 312, and an input/output (I/O) data port(s) 314 that also communicate with the processor 308. The storage system 310 may include removable and/or fixed media, such as floppy disks, ZIP drives, hard disks, or the like, as well as virtual storage, such as a RAMDISK. The I/O data port(s) 314 may be used to transfer information between the data processing system 300 and another computer system or a network (e.g., the Internet). These components may be conventional components, such as those used in many conventional computing devices, and their functionality, with respect to conventional operations, is generally known to those skilled in the art. The memory 306 may be configured with a compatibility engine module 316 that may be configured to evaluate a computer program to determine any required data processing facilities for executing the computer program and also to evaluate whether the computer program is compatible with one or more target data processing systems for execution based on what data processing facilities they have installed.

Figure 4:
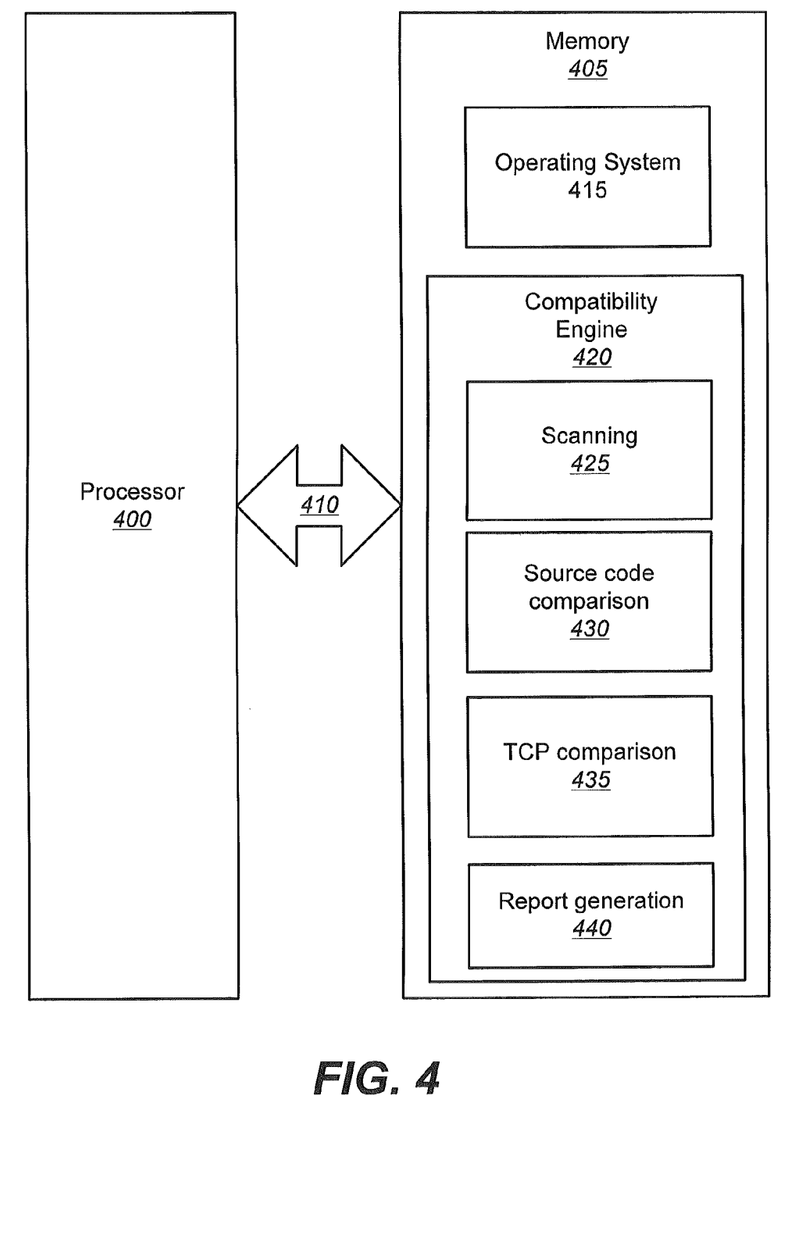
FIG. 4 is a block diagram that illustrates a software/hardware architecture for evaluating a computer program to determine any required data processing facilities for executing the computer program and also for evaluating whether the computer program is compatible with one or more target data processing systems for execution based on what data processing facilities they have installed according to some embodiments of the inventive subject matter.

FIG. 4 illustrates a processor 400 and memory 405 that may be used in embodiments of data processing systems, such as the compatibility engine 200 of FIG. 2 and the data processing system 300 of FIG. 3, respectively, for evaluating a computer program as described above. The processor 400 communicates with the memory 405 via an address/data bus 410. The processor 400 may be, for example, a commercially available or custom microprocessor. The memory 405 is representative of the one or more memory devices containing the software and data used for evaluating a computer program to determine any required data processing facilities for executing the computer program and also for evaluating whether the computer program is compatible with one or more target data processing systems for execution based on what data processing facilities they have installed in accordance with some embodiments of the inventive subject matter. The memory 405 may include, but is not limited to, the following types of devices: cache, ROM, PROM, EPROM, EEPROM, flash, SRAM, and DRAM.

As shown in FIG. 4, the memory 405 may contain up to two or more categories of software and/or data: an operating system 415 and a compatibility engine module 420. The operating system 415 generally controls the operation of the data processing system. In particular, the operating system 415 may manage the data processing system's software and/or hardware resources and may coordinate execution of programs by the processor 400. The compatibility engine module 420 may be configured to evaluate a computer program to determine any required data processing facilities for executing the computer program and also to evaluate whether the computer program is compatible with one or more target data processing systems for execution based on what data processing facilities they have installed. The compatibility engine module comprises a scanning module 425, a source code comparison module 430, a TCP comparison module 435, and a report generation module 440.

The scanning module 425 may be configured to receive a computer program and to scan the program so as to parse the individual instructions. The source code comparison module 430 may be configured to compare the instructions of the computer program with the instructions in a source code catalog 215 and identify any required data processing facilities for executing the computer program. As described above, the source code catalog 215 associates source code instructions with data processing facilities that are required to execute those instructions. Thus, the source code comparison module 430 may identify any required data processing facilities for executing the computer program. The TCP comparison module 435 uses the required data processing facility/facilities identified from comparing the computer program instructions with the source code instructions in the source code catalog 215 to compare with the data processing facilities on the list(s) for the one or more target data processing systems in the TCP 220. The TCP comparison module 435 may then determine whether the computer program is compatible for execution on the target data processing system(s) represented in the TCP 220.

The report generation module 440 may be configured to generate reports that identify required data processing facilities for executing a computer program and/or indicate compatibility of a computer program for execution on one or more target data processing systems based on what data processing facilities they have installed.

Although FIG. 4 illustrates exemplary hardware/software architectures that may be used in data processing systems, such as the compatibility engine 200 of FIG. 2 and the data processing system 300 of FIG. 3, for evaluating a computer program to determine any required data processing facilities for executing the computer program and also for evaluating whether the computer program is compatible with one or more target data processing systems for execution based on what data processing facilities they have installed, it will be understood that embodiments of the present invention are not limited to such a configuration but are intended to encompass any configuration capable of carrying out operations described herein. Moreover, the functionality of the compatibility engine 200 of FIG. 2, the data processing system 300 of FIG. 3, and the hardware/software architecture of FIG. 4 may be implemented as a single processor system, a multi-processor system, or even a network of stand-alone computer systems, in accordance with various embodiments.

Figure 5:
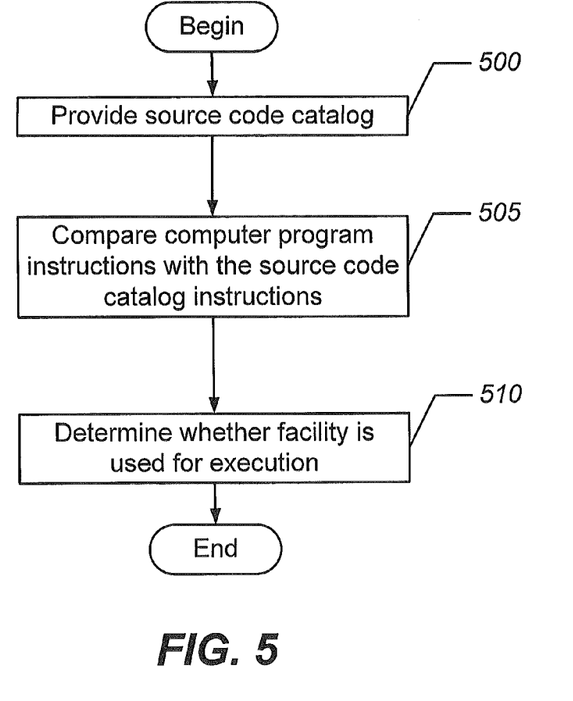
FIGS. 5-7 are flowcharts that illustrate operations for evaluating a computer program to determine any required data processing facilities for executing the computer program and also for evaluating whether the computer program is compatible with one or more target data processing systems for execution based on what data processing facilities they have installed according to some embodiments of the inventive subject matter.
Figure 6:
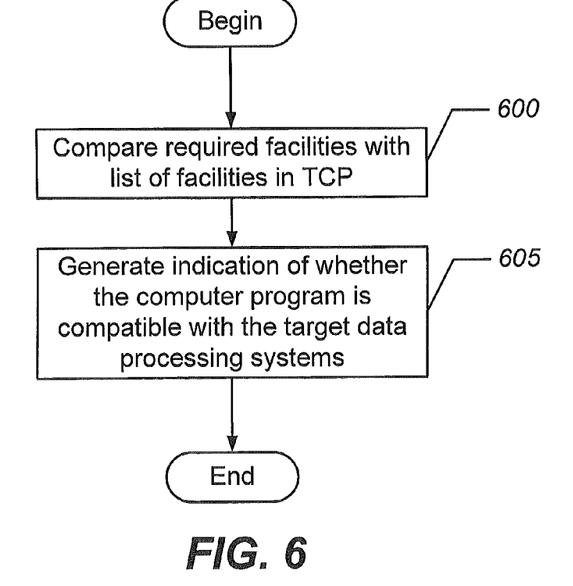
Figure 7:
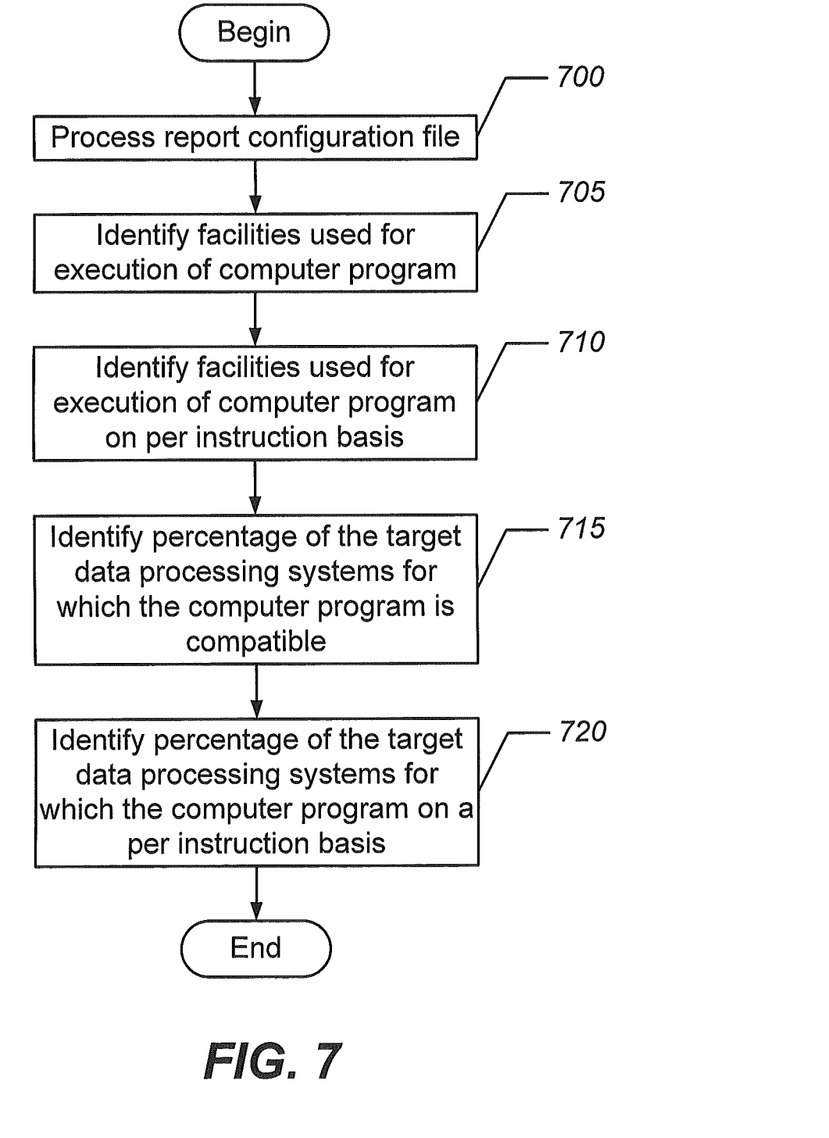

FIGS. 5-7 are flowcharts that illustrate exemplary operations for evaluating a computer program to determine any required data processing facilities for executing the computer program and also for evaluating whether the computer program is compatible with one or more target data processing systems for execution based on what data processing facilities they have installed, according to some embodiments of the inventive subject matter.

Referring now to FIG. 5, operations for evaluating a computer program to determine any required data processing facilities for executing the computer program, according to some embodiments of the inventive concept, begin at block 500 where a source code catalog 215 is provided that associates source code instructions with data processing facilities that are required to execute those instructions. A source code instruction may have one or more data processing facilities associated therewith that are used for executing the instruction on a target data processing system.

At block 505, the computer program instructions are compared with the instructions in the source code catalog 215 and a determination is made at block 515 whether any of the data processing facilities associated with the instructions in the source code catalog 215 are required for execution of the computer program. Reports for the identified data processing facilities can be generated as described below with respect to FIG. 7.

Referring now to FIG. 6, operations for evaluating whether a computer program is compatible with one or more target data processing systems for execution based on what data processing facilities they have installed, according to some embodiments of the inventive concept, begin at block 600 where the required data processing facility/facilities identified from comparing the computer program instructions with the source code instructions in the source code catalog 215 are used to compare with the data processing facilities on the list(s) for the one or more target data processing systems in the TCP 220. The compatibility engine may then, at block 605, determine whether the computer program is compatible for execution on the target data processing systems represented in the TCP 220 and generate an indication thereof. Reports indicating the level of compatibility of the computer program with the target data processing systems represented in the TCP 220 can be generated as described below with respect to FIG. 7.

Referring now to FIG. 7, operations for generating reports based on evaluating a computer program to determine any required data processing facilities for executing the computer program and also for evaluating whether the computer program is compatible with one or more target data processing systems for execution based on what data processing facilities they have installed, according to some embodiments of the inventive subject matter, begin at block 700. A report configuration file may be processed that indicates what reports are should be generated. The report configuration file may be generated based on user input in which a user makes selections for which reports to generate. The following operations for generating reports may or may not be performed based on which reports have been selected as indicated in the report configuration file.

At block 705, the report generation module 340 generates a report that identifies which data processing facilities are required for execution of the computer program. At block 710, the report generation module 340 generates a report that provides an annotated listing of the computer program in which the required data processing facilities are identified on a per instruction basis. When the TCP includes lists of facilities associated with multiple target data processing systems, the report generation module 340 generates a report at block 715 that indicates the percentage of the target data processing systems the computer program would be compatible with, i.e., be able to execute on because any required data processing facilities are installed. The report of block 715 can also be generated on a per instruction basis at block 720 in which individual instructions of the computer program have a percentage associated therewith that indicates the probability that the instruction can be executed on a particular group of target data processing systems. The report generation module 340 may also provide indications of which target data processing system(s) in the TCP the computer program is compatible with for execution thereon.

The embodiments of methods, systems, and computer program products described herein may allow for evaluating a computer program to determine any required data processing facilities for executing the computer program and also for evaluating whether the computer program is compatible with one or more target data processing systems for execution based on what data processing facilities they have installed.

This may assist software developers in developing code for particular target data processing system environments to ensure the code they are writing will be able to properly execute on the target environment. Embodiments of the inventive subject matter may be implemented as a pre-compiler to provide informational feedback about potential compatibility issues. Embodiments of the inventive subject matter may also be implemented as part of a software development where assembly code is checked in real time and compatibility issues are highlighted when found.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
   performing operations as follows wherein at least a portion of at least one of the operations is performed on at least one processor:
   comparing instructions of a computer program with source code instructions in a source code catalog that are associated with a required data processing facility; and
   determining whether the required data processing facility is used for execution of any of the instructions of the computer program based on the comparison of the computer program instructions with the source code instructions in the source code catalog.

2. The method of claim 1, wherein the source code instructions are associated with a plurality of data processing facilities and wherein determining whether the required data processing facility is used for execution of any of the instructions of the computer program comprises:
   determining whether any of the plurality of data processing facilities is used for execution of any of the instructions of the computer program based on the comparison of the computer program instructions with the source code instructions in the source code catalog.

3. The method of claim 2, further comprising:
   generating a report that identifies which ones of the plurality of data processing facilities are used for execution of the instructions of the computer program.

4. The method of claim 3, wherein generating the report comprises:
   generating the report that identifies, for each respective one of the instructions of the computer program, which ones of the plurality of data processing facilities are used for execution of the respective one of the instructions of the computer program.

5. The method of claim 1, further comprising:
   providing a template configuration profile that comprises a list of data processing facilities associated with a target data processing system; and
   generating an indication of whether the instructions of the computer program are compatible with the target data processing system for execution based on the determination of whether the required data processing facility is used for execution of any of the computer program instructions and the list of data processing facilities associated with the target data processing system in the template configuration profile.

6. The method of claim 5, wherein the target data processing system is one of a plurality of data processing systems; and
   wherein the list of data processing facilities is a first list of data processing facilities and the template configuration profile comprises a second list of data processing facilities associated with the plurality of data processing systems.

7. The method of claim 6, further comprising:
   generating an indication of whether the instructions of the computer program are compatible with the plurality of target data processing systems for execution based on the determination of whether the required data processing facility is used for execution of any of the computer program instructions and the second list of data processing facilities associated with the plurality of target data processing systems in the template configuration profile.

8. The method of claim 7, wherein generating the indication comprises:
   generating a report that identifies a percentage of the plurality of target data processing systems for which the instructions of the computer program are compatible.

9. The method of claim 7, wherein generating the indication comprises:
   generating a report that identifies, for each respective one of the instructions of the computer program, a percentage of the plurality of target data processing systems for which the respective one of the instructions of the computer program is compatible.

10. The method of claim 1, wherein the source code instructions in the source code catalog are defined by a high-level programming language that is compiled to generate object code.

11. The method of claim 1, wherein the source code instructions in the source code catalog are defined by assembly language.

12. The method of claim 1, wherein the source code instructions in the source code catalog are defined by an interpreted programming language.

13. The method of claim 1, wherein the required data processing facility comprises a hardware component.

14. The method of claim 1, wherein the required data processing facility comprises a firmware component.

15. A system, comprising:
a processor; and
a memory coupled to the processor that comprises computer-readable program code that when executed by the processor causes the processor to perform operations comprising:
    comparing instructions of a computer program with source code instructions in a source code catalog that are associated with a required data processing facility; and
    determining whether the required data processing facility is used for execution of any of the instructions of the computer program based on the comparison of the computer program instructions with the source code instructions in the source code catalog.

16. The system of claim 15, wherein the source code instructions are associated with a plurality of data processing facilities, and wherein determining whether the required data processing facility is used for execution of any of the instructions of the computer program comprises:
    determining whether any of the plurality of data processing facilities is used for execution of any of the instructions of the computer program based on the comparison of the computer program instructions with the source code instructions in the source code catalog.

17. The system of claim 16, wherein the operations further comprise:
    generating a report that identifies which ones of the plurality of data processing facilities are used for execution of the instructions of the computer program.

18. The system of claim 15, wherein the operations further comprise:
    providing a template configuration profile that comprises a list of data processing facilities associated with a target data processing system; and
    generating an indication of whether the instructions of the computer program are compatible with the target data processing system for execution based on the determination of whether the required data processing facility is used for execution of any of the computer program instructions and the list of data processing facilities associated with the target data processing system in the template configuration profile.

19. A computer program product, comprising:
a computer readable storage medium having computer readable program code embodied in the medium, the computer readable program code comprising:
    computer readable program code to compare instructions of a computer program with source code instructions in a source code catalog that are associated with a required data processing facility; and
    computer readable program code to determine whether the required data processing facility is used for execution of any of the instructions of the computer program based on the comparison of the computer program instructions with the source code instructions in the source code catalog.

20. The computer program product of claim 19, wherein the source code instructions are associated with a plurality of data processing facilities and wherein the computer readable program code to determine whether the required data processing facility is used for execution of any of the instructions of the computer program comprises:
    computer readable program code to determine whether any of the plurality of data processing facilities is used for execution of any of the instructions of the computer program based on the comparison of the computer program instructions with the source code instructions in the source code catalog.

21. The computer program product of claim 20, further comprising:
    computer readable program code to generate a report that identifies which ones of the plurality of data processing facilities are used for execution of the instructions of the computer program.

22. The computer program product of claim 19, further comprising:
    computer readable program code to provide a template configuration profile that comprises a list of data processing facilities associated with a target data processing system; and
computer readable program code to generate an indication of whether the instructions of the computer program are compatible with the target data processing system for execution based on the determination of whether the required data processing facility is used for execution of any of the computer program instructions and the list of data processing facilities associated with the target data processing system in the template configuration profile.

* * * * *